Sept. 2, 1952     T. D. FOSTER ET AL     2,608,897
TOOL SLIDE
Filed May 10, 1946     4 Sheets-Sheet 1
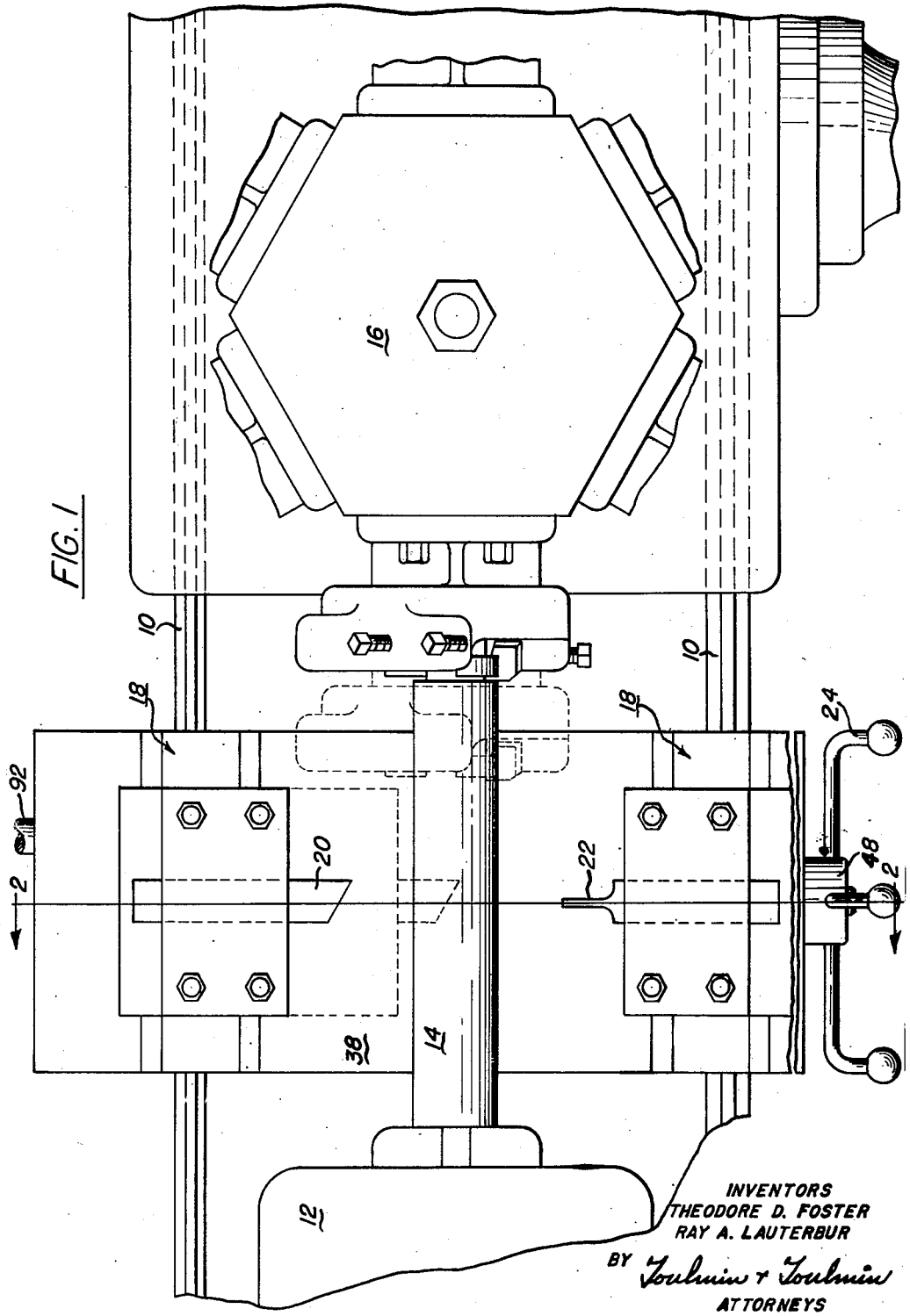
INVENTORS
THEODORE D. FOSTER
RAY A. LAUTERBUR
BY *Toulmin + Toulmin*
ATTORNEYS

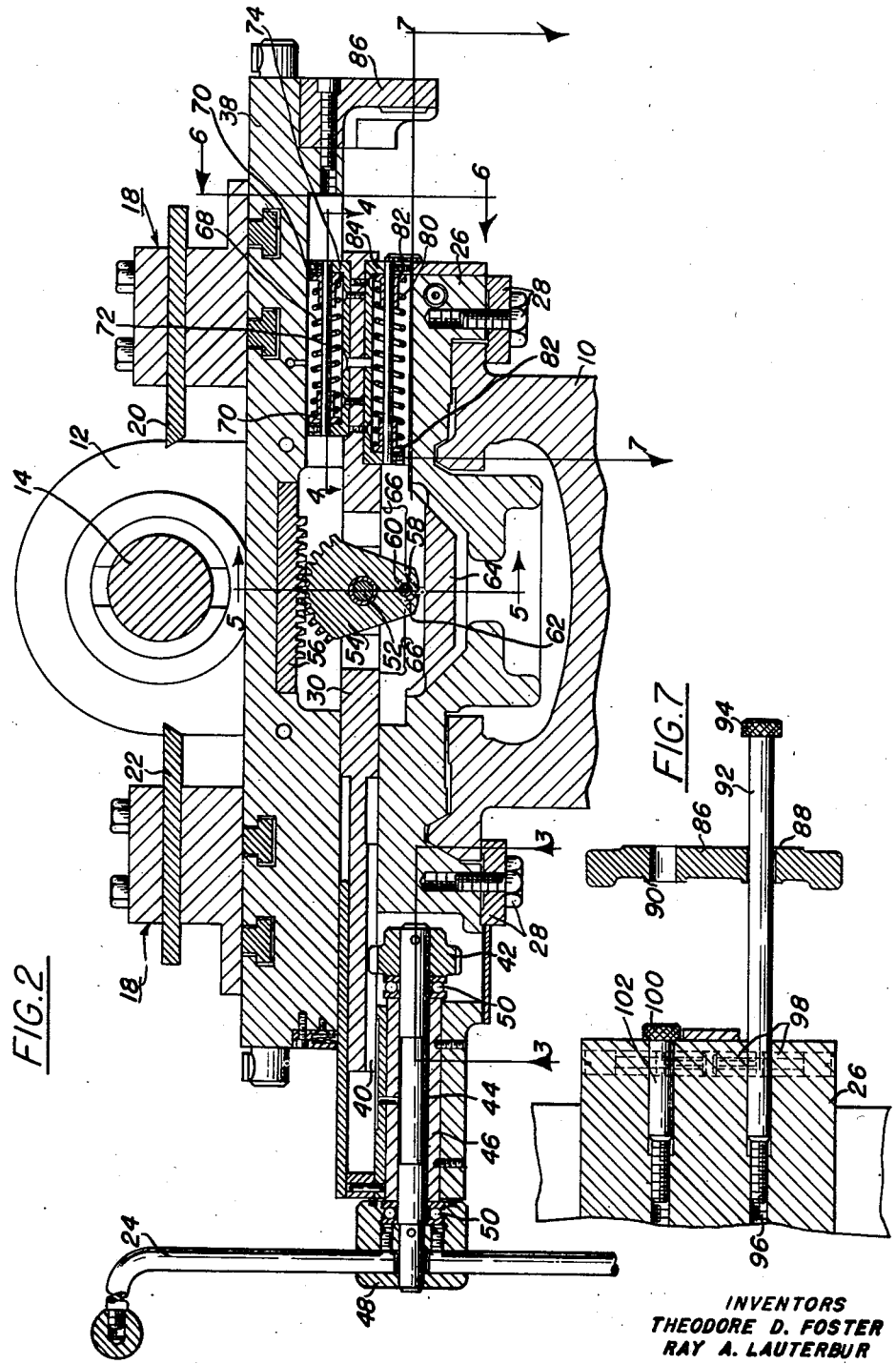

Sept. 2, 1952     T. D. FOSTER ET AL     2,608,897
TOOL SLIDE
Filed May 10, 1946     4 Sheets-Sheet 3
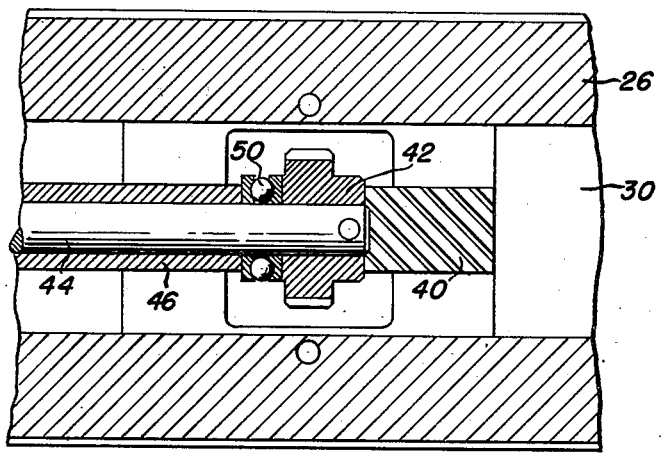
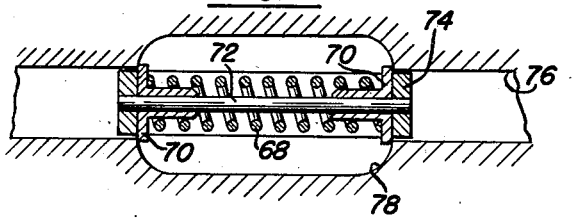
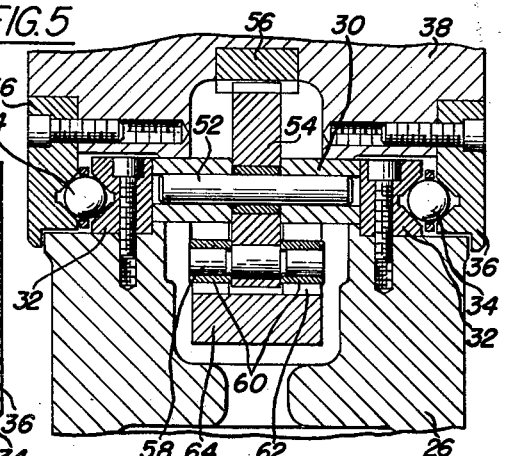
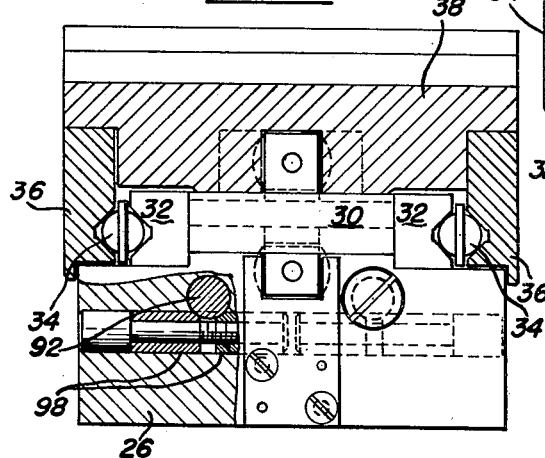
INVENTORS
THEODORE D. FOSTER
RAY A. LAUTERBUR
BY
Toulmin & Toulmin
ATTORNEYS

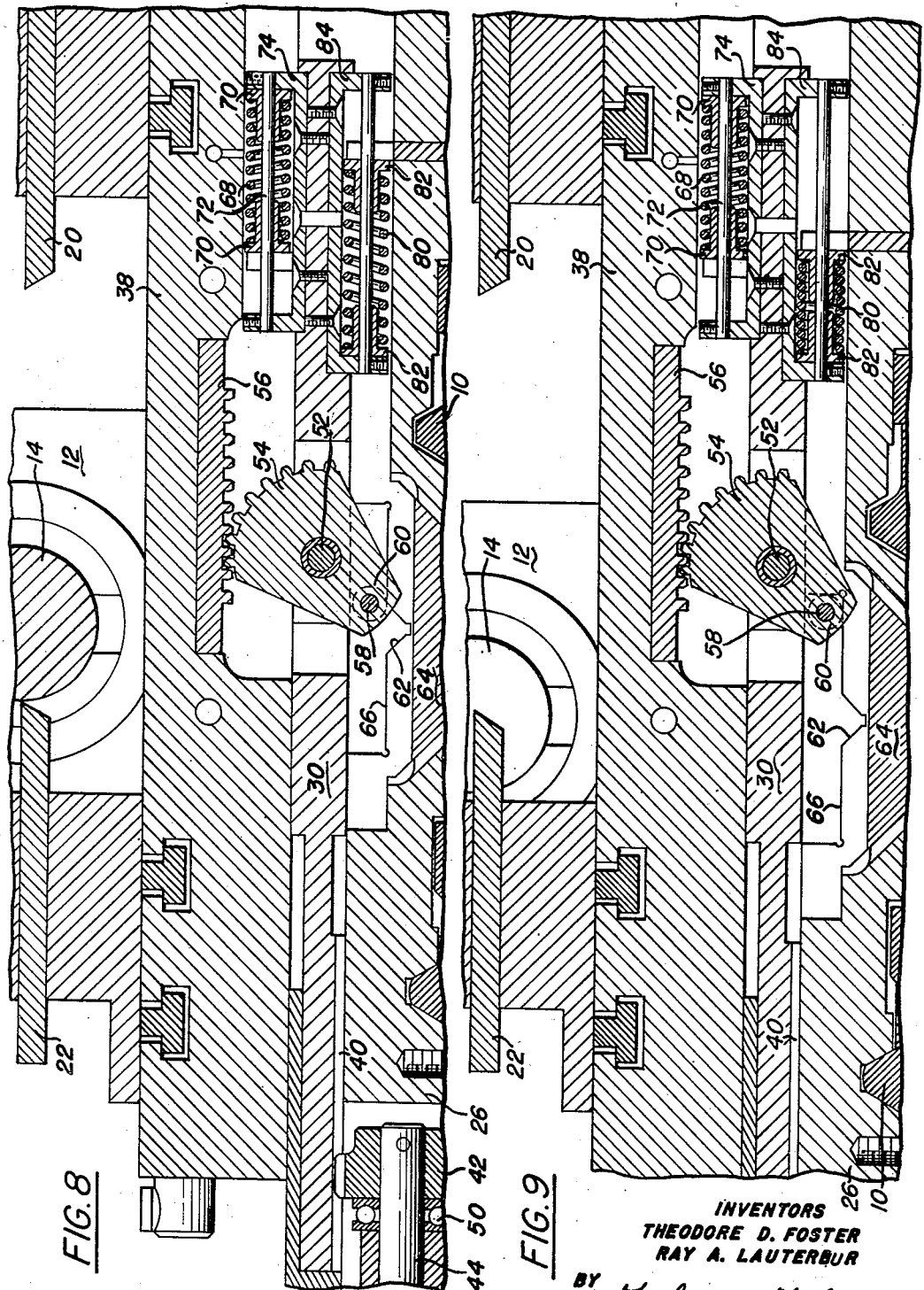

Patented Sept. 2, 1952

2,608,897

UNITED STATES PATENT OFFICE 2,608,897

TOOL SLIDE

Theodore D. Foster and Ray A. Lauterbur, Sidney, Ohio, assignors to The Monarch Machine Tool Co., Sidney, Ohio, a corporation of Ohio Application May 10, 1946, Serial No. 668,806

5 Claims. (Cl. 82—25)

This invention relates to machine tools, and especially to tool actuating mechanisms such as cross slides.

The particular object of this invention is to provide an improved cross slide mechanism for actuating a tool in a machine such as a lathe and which returns automatically to its retracted position.

Another object is to provide a cross slide mechanism for actuating a plurality of tools toward and away from the workpiece and which automatically returns to a centered position upon release of the operating mechanism.

Still another object is to provide a cross slide having front and rear tools which can be operated in either direction and which has a fast approach and a feed rate and which automatically returns to its centered position when the operating mechanism is released.

Still another object is to provide a cross slide having automatic centering means which is also provided with adjustable stops whereby the position of the cross slide in either direction of movement can be closely regulated.

These and other objects and advantages become more apparent upon reference to the following specification taken together with the accompanying drawings in which:

Figure 1 is a plan view showing a cross slide according to the present invention mounted on a turret lathe;

Figure 2 is a vertical section through the cross slide and is indicated by the line 2—2 on Figure 1;

Figure 3 is a view indicated by the line 3—3 on Figure 2 showing the drive mechanism;

Figure 4 is a section taken substantially along the line 4—4 of Figure 2 and shows one of the centering springs by which the cross slide mechanism is centered;

Figure 5 is a vertical section taken substantially along the line 5—5 of Figure 2 and shows the connection between the slides;

Figure 6 is a section taken substantially along the line 6—6 of Figure 2 and shows the manner of mounting the slides;

Figure 7 is a plan section taken substantially along the line 7—7 of Figure 2 and shows the adjustable stop bars for limiting travel on the cross slide;

Figures 8 and 9 are views of the mechanism in different stages of the work cycle.

General arrangement

According to this invention a cross slide is constructed having a bed portion adapted for being adjustably secured to a machine tool bed such as a lathe. Reciprocable on the cross slide bed in a transverse direction is a first slide. Reciprocably mounted above the first slide is a second or tool carrying slide. Suitable anti-friction means may be provided for journalling the portions of the cross slide relative to each other and, preferably, the upper or tool carrying slide is guided on the cross slide bed for greater accuracy and rigidity.

Actuating mechanism comprising a manually rotatable hand wheel and a gear and rack are provided for reciprocating the first, or sub-slide transversely of the axis of the machine tool on which the cross slide is mounted. Actuation of the sub-slide results in rotation of a gear segment which is pivoted on the said sub-slide and which engages a rack carried on the tool slide. Rotation of the gear segment thus produces relative movement between the said slides. With the sub-slide moving relative to the cross slide bed and the tool slide moving relative to the sub-slide, a rapid advancing movement of the tool toward the workpiece results.

After a predetermined advancing movement of the tool, the rotation of the aforementioned gear segment relative to the sub-slide is halted and thereafter the two slides move as a unit. This results in a reduced speed feed stroke of the tool into the work. During the movement of the slides relatively, and of the sub-slide relative to the cross slide bed, centering springs are loaded which, when the actuating hand wheel is released, quickly drives the tool and sub-slides back to their starting position where the tools are disengaged from the work.

The aforementioned cycle of operations is identical for both directions of movement of the tool slide so that front and back tools carried thereby may be selectively engaged with the workpiece. Adjustable stop means are provided by means of which the travel of the tool slide can be halted at the proper position correctly to machine the workpiece.

Structural arrangement

Referring to the drawings, Figure 1 shows a machine tool having a bed 10 which supports a spindle 12 that carries a workpiece 14 in rotation. Also mounted on the bed 10 is a turret 16 which is movable to and from the workpiece 14 to perform various work operations thereon by means of the tools carried in the several turret faces.

Also carried on the bed 10 is a cross slide mechanism generally indicated at 18 which comprises a tool 20 at the rear and another tool 22 at the front of the machine, one of the tools being a cut off. The cross slide is actuated in its two directions of movement by a wheel 24 at the operator's side of the machine which may comprise a plurality of radially extending arms which may readily be grasped by the machine operator.

The cross slide mechanism is better shown in Figures 2 through 7 wherein it will be seen to comprise a bed 26 adapted for being clamped to the bed 10 as by the plates and bolts 28. The bed 26 reciprocably receives a first or sub-slide 30 which is guided in reciprocation between a pair of spaced bars 32. The bars 32 are best seen in Figures 5 and 6 wherein it will be seen that they also comprise races within which are movable the ball bearings 34. The outer races for the bearings 34 comprise a pair of plates 36 secured to the opposite sides of a second or tool slide 38. The tool slide is thus guided in reciprocation by the cross slide bed 26. This results in accuracy substantially greater than would be obtained if the upper slide were guided on the sub-slide.

For actuating the sub-slide 30 in reciprocation, there is provided at the operator's end thereof a skew rack portion 40 which is engaged by the skew pinion 42. The pinion 42 is carried on a shaft 44 extending through a bushing 46 and terminating in the hub 48 of the wheel 24. Suitable anti-friction bearings as at 50 absorb axial thrust on the shaft 44 while the bushing 46 journals the shaft against radial thrusts.

The sub-slide 30 has an aperture therethrough intermediate its ends which is traversed by a pivot pin 52 which journals a gear segment 54. The gear segment 54 meshes with a rack 56 carried on the tool slide 38. The other side of the gear segment 54 carries a projection, in this illustration a pin 58 which carries the rollers 60 at its opposite ends. The rollers 60, when the slide 30 is in its Figure 2 position, rest in a V-notch 62 which forms abutments in a block 64 which is carried by the bed 26 by any suitable means such as screws and dowels not shown. The block 64 is substantially U-shaped in cross section to receive the end of the gear segment 54 and is also notched as at 66 on either side of the V-notch 62.

The tool slide and sub-slide, and the sub-slide and the bed are further interconnected by centering springs continuously urging the said slides and bed toward their Figure 2 position. Between the tool slide 38 and sub-slide 30, there is the spring 68 that is engaged at each end by a collar 70. The collars 70 are freely slidable on a rod 72 which is rigidly secured in the ends of a bracket 74 affixed to the sub-slide 30.

On reference to Figure 4, it will be noted that the tool slide 38 is provided with a slot 76 of a width greater than the width of the bracket 74 and which has an enlarged portion 78 of exactly the same length as the distance between the inner faces of the upstanding ends of the bracket 74. It will be noted that the collars 70 extend laterally beyond the upturned edges of the bracket 74 and are abutted by the ends of the enlarged portion 78. Thus, relative movement between the tools slide 38 and sub-slide 30 in either direction brings about a compression of the spring 68 and hence a restoring force to return the slides to their Figure 2 position.

A similar arrangement including the spring 80, the collars 82 and the bracket 84 connects the sub-slide with the cross slide bed and also exerts a restoring force on the slide 30 to return it to its Figure 2 position when moved therefrom in either direction.

For stopping the movement of the tools 20 and 22 in any predetermined position, there is provided a stop mechanism best seen in Figures 2 and 7. Depending from the right end of the tool slide 38 is a block 86 which is apertured as at 88 and which has a boss at 90. Passing through the aperture 88 is a screw 92 having a head 94 thereon and being adjustably carried in the bed 26 as by means of the screw threads 96 and the clamping device indicated at 98. When the tool slide 38 moves to the right a predetermined amount, the head 94 of the screw 92 engages the surface of the block 86 and positively stops further travel of the tool slide. When the tool slide moves to the left a predetermined distance, the head 100 of a second stop screw 102 engages the boss 90 and positively stops the tool slide.

Reference to Figures 2, 8 and 9 will serve to make the operation of this invention clear. In Figure 2, the cross slide is shown in its rest position. When it is desired to actuate the cross slide in order to bring the tools carried thereby into cutting relationship with a workpiece, the operator rotates the wheel 24 thereby driving the pinion 42 and therethrough the sub-slide 30 by means of the rack 40.

Assuming the movement of the slide 30 is toward the right, the first movement of the said sub-slide will also bring about movement of the tool slide 38, and at a greater rate of speed. This will be apparent upon reference to Figure 8 wherein it will be seen that the rightward movement of the tool slide 30 has caused the gear segment 54 to rotate about its pivot 52 until the rollers 60 are disengaged from the V-notch 62. During this time the rate of movement of the tool slide 38 is substantially greater than that of the sub-slide 30 and, accordingly, a rapid approach of the tool to the work is had. During the rightward movement of the slides both of the springs 68 and 80 are compressed to exert a thrust toward the left on the said slides.

Preferably, the tool is about to engage the work when the slides are in their Figure 8 positions. This utilizes the high speed movement of the tool slide to its fullest advantage.

Thereafter, continued movement of the tool into the work is had by continuing rotation of the wheel 24. This continues movement of the sub-slide 30 toward the right and therethrough drives the tool slide 38 toward the right. However, since the rollers 60 are now riding on the flat portion of the notches 66, there is no relative rotation of the gear segment 54 and the slides 38 and 30 move as a single unit. It will be apparent that the rate of movement of the slide 38 is substantially lower than during its approaching movement and this reduced speed of movement is utilized for a feeding stroke. It will be noted that during the feed movement of the cross slide 38, there is no further compression of the spring 68 but the spring 80 is further compressed to its Figure 9 position.

After the cut has been completed and the tool slide is stopped by one of the stop screws, the cross slide may be returned to its Figure 2 position merely by releasing the wheel 24. It will be obvious the above cycle of operations obtains whether the tool slide 38 is moved to the right or to the left from its Figure 2 position.

In the operation of a machine such as the turret lathe shown in Figure 1 equipped with a cross slide according to this invention, the rate of operation of the machine is exceedingly rapid and there is no time lost in returning the cross slide to its rest position. Furthermore, the cross slide automatically centers so that ample clearance is provided for box tools, dies, etc. carried on the machine turret. Maximum speed and efficiency is obtained in the cross slide mechanism itself by providing for the rapid approach and subsequent feed of the tool into the work.

It will be understood that this invention is susceptible to modification in order to adapt it to different usages and conditions and, accordingly, it is desired to comprehend such modifications within this invention as may fall within the scope of the appended claims.

We claim:

1. In a slide mechanism, a bed, a second slide reciprocably guided on said bed, a first slide reciprocably guided on said bed, yielding means interconnecting said second slide and said first slide with said bed for urging said slides and bed into a predetermined relative position, means for actuating said first slide in either direction, and means for actuating said second slide by the movement of said first slide comprising a gear segment pivotally mounted on said first slide, a rack on said second slide engaged by said gear segment, a projection on the other end of said gear segment, and a notch in said bed wherein said projection normally rests whereby when said first slide moves from its normal position carrying said gear segment pivot therewith, said projection is first restrained by said bed notch causing a velocity of said second slide greater than the velocity of said first slide, and upon release of said projection by said bed notch causing a velocity of said second slide substantially equal to the velocity of said first slide.

2. In a slide mechanism, a bed adapted for being adjustably secured to a machine tool, a slide guided on said bed in reciprocation, a gear sector having teeth in mesh with corresponding teeth on said slide and extending toward said bed, a roller on the end of said gear sector adjacent said bed and a notch in said bed to engage said roller, a second slide guided on said bed in reciprocation pivotally connected with the center of said gear sector, means for actuating said second slide to move said gear sector, first in rotation until said roller is released from said notch, and thereafter in nonrotative reciprocation whereby said slide is moved through rapid approach and feed strokes.

3. A slide mechanism comprising a bed, a slide reciprocable on said bed, a rack on said slide, a gear sector engaging with said rack and having a pivot and an end opposite said gear sector, a longitudinal member reciprocable in the direction of said slide and carrying said pivot to reciprocate the pivot of said gear sector relative to said bed at an angle to the axis of said pivot, an abutment on said bed to abut said gear sector end to provide interlocking engagement therebetween during a first period of reciprocation of said gear sector pivot to thus reciprocate said slide at a greater rate than said gear sector pivot, and means to release said interlocking engagement between said gear sector end and said bed during a second period of reciprocation of said gear sector pivot to thus reciprocate said slide at substantially the same rate as said gear sector pivot.

4. A slide mechanism adapted for reciprocation in either direction from a center position comprising, a bed, a slide reciprocable on said bed, a power train adapted to transmit power in either direction interconnecting said bed and said slide to provide said reciprocation in either direction, and centering spring means acting between said bed and said slide and deflectable upon movement of said slide in either direction from center to urge restoration of said slide toward said center, said power train including a pivotable lever reciprocable at an angle to the pivot axis by said power train, said lever having an end, a notch in said bed engaging said end to provide a first degree of interlocking engagment between said lever end and said bed for a first period of reciprocation of said lever pivot, and means to release said end from said notch to change the degree of engagement between said lever end and said bed for a second period of reciprocation of said lever pivot.

5. In a slide mechanism, a bed, a rotatable shaft journaled in said bed, a first drive element on said shaft, a first slide and a second slide reciprocable on said bed, said first slide carrying a second drive element complemental to and in driving engagement with said first drive element, a pin mounted on said first slide, a gear segment mounted on said pin and having a projection, a notch in said bed wherein said projection normally lies, a rack on said second slide in driving engagement with said gear segment, whereby upon movement of said rotatable shaft said first slide and said pin and gear segment carried thereon are moved at a first velocity and so long as said projection is engaged in said bed notch said second slide is driven by said gear segment at a second velocity greater than the first velocity, and when said projection is released from said notch said second slide is driven at a velocity lower than said second velocity.

THEODORE D. FOSTER.
RAY A. LAUTERBUR.

REFERENCES CITED

The following references are of record in the file of this patent:

UNITED STATES PATENTS

| Number | Name | Date |
| --- | --- | --- |
| 238,254 | Sellers | Mar. 1, 1881 |
| 1,197,541 | Potter | Sept. 5, 1916 |
| 1,346,259 | Schlieder | July 13, 1920 |
| 1,568,641 | Thacher | Jan. 5, 1926 |
| 1,604,204 | Tessky | Oct. 26, 1926 |
| 1,611,191 | Heard et al. | Dec. 21, 1926 |
| 1,840,231 | Harrison | Jan. 5, 1932 |
| 2,369,039 | Gocht | Feb. 6, 1945 |
| 2,435,321 | Ogren | Feb. 3, 1948 |